United States Patent
Riddle et al.

[15] 3,672,513
[45] June 27, 1972

[54] FISHING POLE SUPPORTS

[72] Inventors: Franklin D. Riddle, Greenville, S.C.; John T. Willis, Miami, Fla.

[73] Assignee: Southern Machinery Company, Green, S.C.

[22] Filed: Sept. 21, 1970

[21] Appl. No.: 73,999

[52] U.S. Cl. .................... 211/60 R, 24/241 PS, 224/42.1 C, 224/42.45 R, 248/201, 248/251
[51] Int. Cl. ......................................................... A47f 7/00
[58] Field of Search .......................... 248/39, 40, 251, 201; 211/60 R, 66, 4, 8; 224/42.1 C, 42.1 G, 42, 46, 42.45 R, 39 R, 37; 70/57-62; 24/73 HR, 241 PS

[56] References Cited

UNITED STATES PATENTS

| 3,291,427 | 12/1966 | Hutchings | 211/60 R X |
|---|---|---|---|
| 3,376,614 | 4/1968 | Stahl | 224/42.1 C X |
| 2,331,816 | 10/1943 | Tollefson | 24/241 PS |
| 896,084 | 8/1908 | Calvert | 24/241 PS |
| 785,538 | 3/1905 | Barton | 24/73 UX |
| 1,618,321 | 2/1927 | Woods | 24/241 PS |
| 2,953,251 | 9/1960 | Stone | 211/4 |
| 3,155,299 | 11/1964 | Horne | 211/60 R X |

Primary Examiner—Roy D. Frazier
Assistant Examiner—Abraham Frankel
Attorney—B. P. Fishburne, Jr.

[57] ABSTRACT

A pair of coacting reversely mounted support brackets receive the butt and rod ends of a pair of fishing poles in reverse direction to support the same securely beneath the roof of a cabin cruiser or the like. The poles are stored out of the way in overhead positions. Positive locking means on the brackets assure that the poles will not drop due to vibrations or movement of the boat. The locking means are releasable manually.

3 Claims, 15 Drawing Figures

INVENTORS
FRANKLIN D. RIDDLE &
JOHN T. WILLIS

BY B.P.Fishburn, Jr.
ATTORNEY

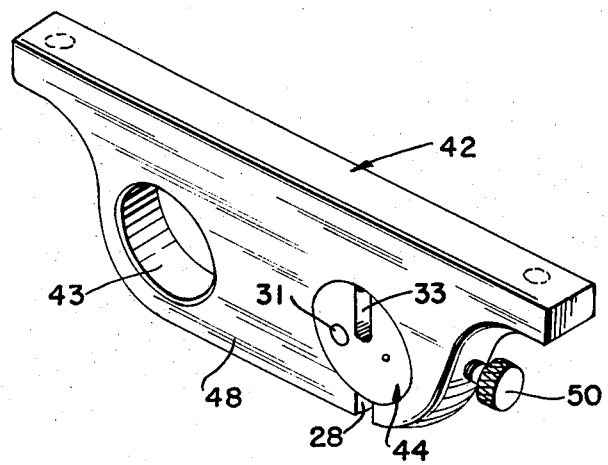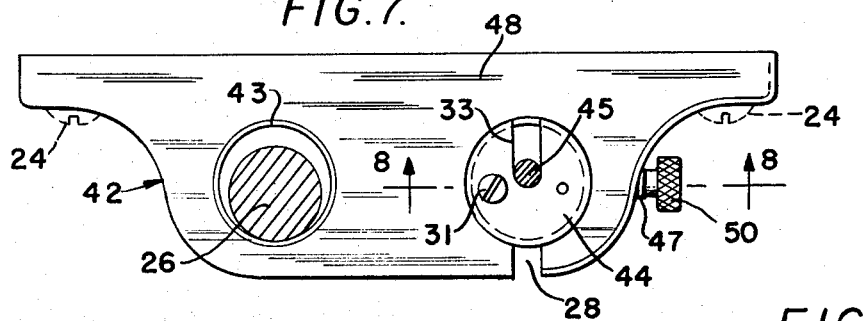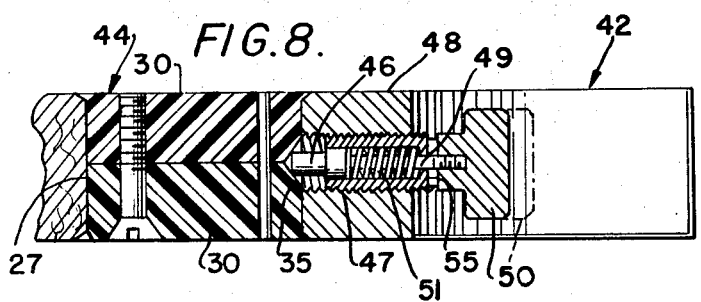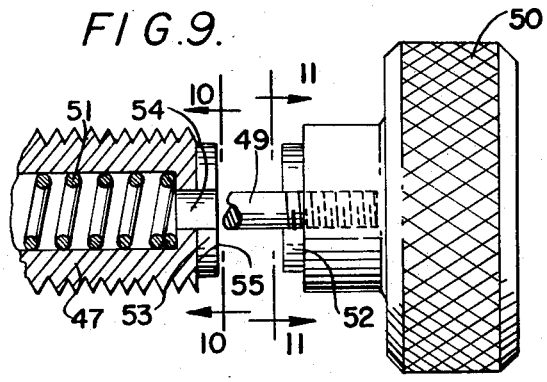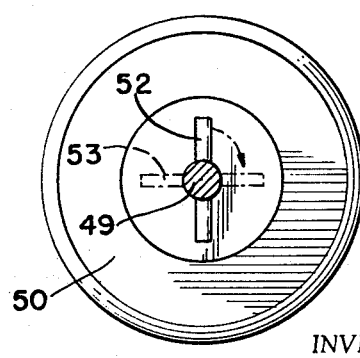

INVENTOR
FRANKLIN D. RIDDLE &
JOHN T. WILLIS

BY B.P. Fishburn, Jr.
ATTORNEY

FISHING POLE SUPPORTS

The object of the invention is to provide a more secure and reliable overhead supporting means for large fishing poles on deep sea fishing boats and the like. Various means are known to support such poles and some of the means are rather haphazard and unreliable with the results that the heavy poles sometimes drop when the boat moves in the water. The present invention securely supports fishing poles in an overhead horizontal position and secures them in this position against accidental displacement by a simplified positive locking means which can be released very easily at any desired time to remove the rods or poles. The objective of the invention is accomplished with economy and with materials which resist corrosion and are rugged and durable so as to be long-lasting in use. Each companion pair of supporting components in the invention is constructed to support a pair of fishing poles extending in opposite directions side-by-side. A number of poles can be supported beneath the ceiling of a cabin cruiser in this manner with security.

BRIEF DESCRIPTION OF DRAWING FIGURES

FIG. 6 is a perspective view of a modification of the pole supporting bracket.

FIG. 7 is a side elevational view of the same in the locked position.

FIG. 8 is an enlarged horizontal section taken on line 8-8 of FIG. 7.

FIG. 9 is an enlarged exploded elevational view of releasable locking means.

FIG. 10 is an end elevation taken on line 10—10 of FIG. 9.

FIG. 11 is a similar view taken on line 11—11 of FIG. 9.

DETAILED DESCRIPTION

Figure 1:
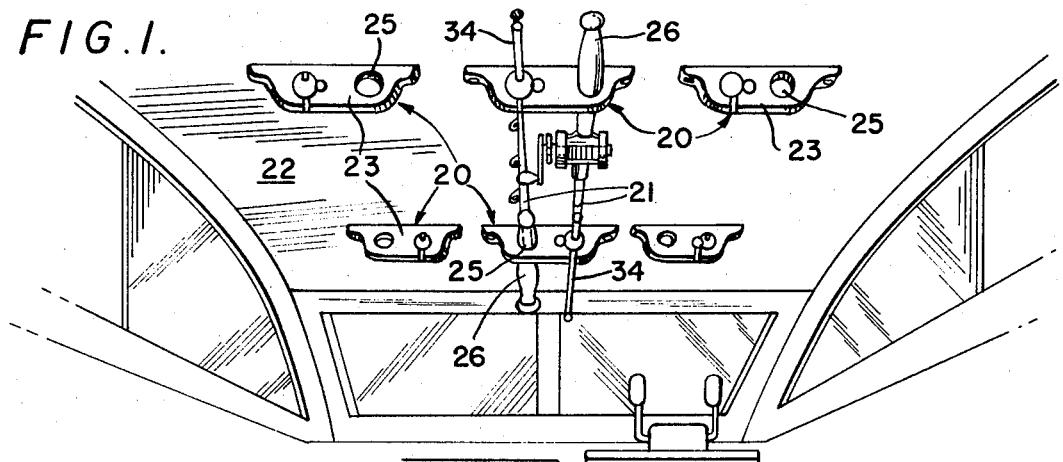
FIG. 1 is a general perspective view of the interior of a boat equipped with fishing pole supports in accordance with one embodiment of the invention.

Referring to the drawings in detail wherein like numerals indicate like parts and directing attention first to FIGS. 1 through 5, the roof or ceiling of a cabin cruiser is indicated in FIG. 1 upon which are mounted coacting pairs of hangers or support units 20 for fishing poles 21 according to one form of the invention. It can be noticed in FIG. 1 that the units 20 are arranged in longitudinally spaced opposed pairs and although each unit is structurally identical to every other unit, the coacting pairs are reversed end-for-end in use so that the poles or rods 21 are supported in side-by-side parallel oppositely extending relation close to the roof or ceiling 22. This arrangement of the invention units is adhered to throughout the several forms to be described and therefore FIG. 1 is typical with respect to all forms or modifications and therefore the illustration need not be repeated. The objective achieved in all forms is the secure supporting or storage of large fishing poles in an out-of-the-way overhead position without fear of having the poles fall accidentally and yet allowing their removal for use without difficulty at any time.

Continuing to refer to FIGS. 1 through 5, each unit 20 preferably comprises a wooden or plastic plate-like body portion or bracket 23 adapted to be secured edgewise and vertically to the ceiling 22 by screws 24 or the like at the opposite ends of the bracket. Each bracket is provided near one end with a relatively large circular through opening 25 adapted to receive and support removably the butt or handle 26 of one fishing pole 21 in the manner described in connection with FIG. 1.

Near its opposite end, each bracket 23 contains another through opening 27 having an intersecting radial slot 28 opening through the lower edge of the bracket 23 when mounted in the use position. Rotatable in the opening 27 is a two-section preferably nylon or plastic cylinder or plug 29, FIG. 5, having half sections 30 secured in assembly by a suitable fastener 31. The locking cylinder 29 is flanged on its opposite end as at 32 for preventing axial displacement in the opening or bore 27. The cylinder 29 also has a radial axially extending groove 33 opening through both ends thereof adapted to accommodate the slender tip portion 34 of a pole 21 and this groove is of the same width as the slot 28 and adapted to register therewith, when the cylinder 29 is rotated to the pole-releasing position. In such position, the groove 33 faces downwardly. In the pole-securing position, FIG. 2, the groove 33 is upwardly directed and spaced 180° from the slot 28.

Figure 2:
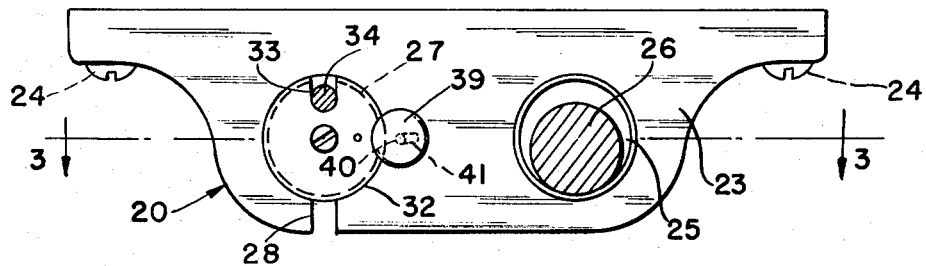
FIG. 2 is an enlarged side elevational view of one support bracket or component of a pair embodying the invention.
Figure 3:
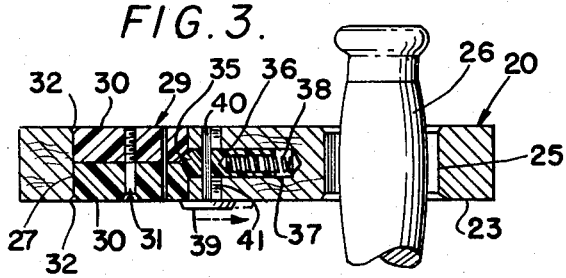
FIG. 3 is a horizontal section taken on line 3—3 of FIG. 2.
Figure 4:
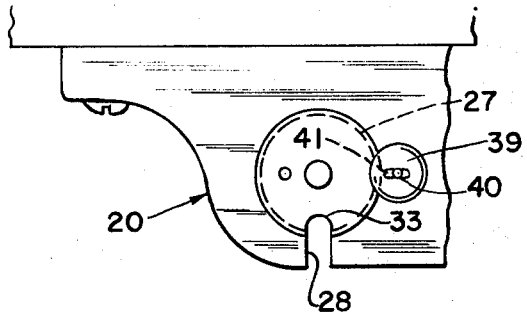
FIG. 4 is a fragmentary elevational view similar to FIG. 2 showing the pole locking means in a release position, FIG. 2 illustrating the pole locked in the supported position.
Figure 5:
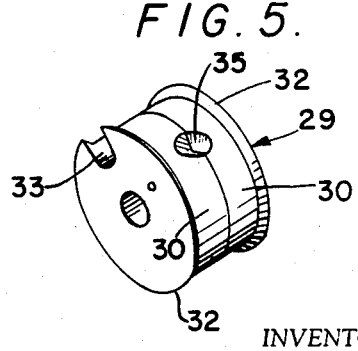
FIG. 5 is a perspective view of a rotary locking cylinder or plug.
Figure 12:
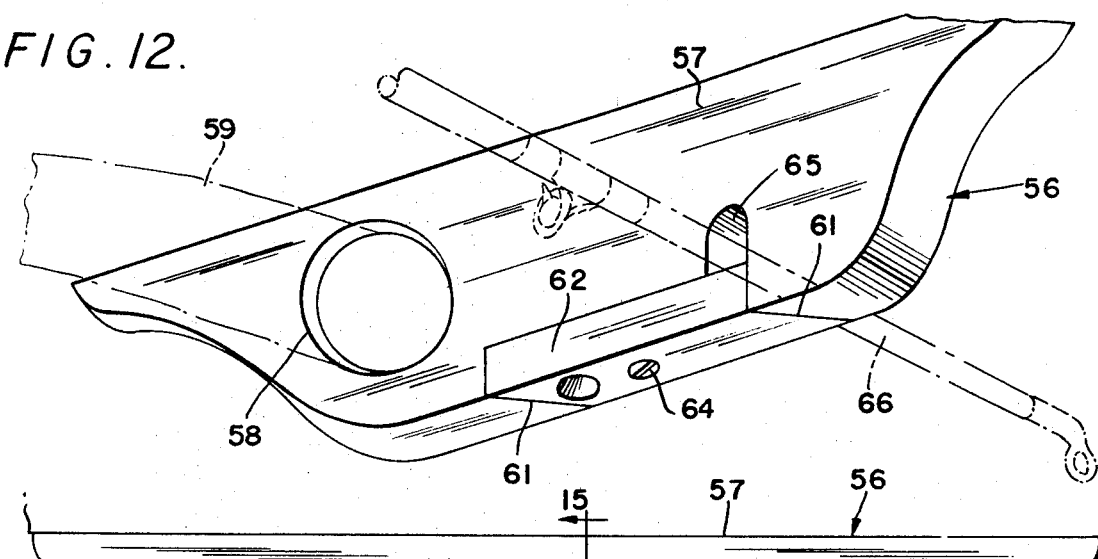
FIG. 12 is a perspective view of another modified form of supporting bracket or unit according to a preferred form of the invention.

In order to releasably lock the cylinder 29 in the position shown in FIG. 2, at least one detent recess 35 is formed in the periphery of the cylinder, FIGS. 3 and 5, and receives a radial locking pin 36 contained within a bore 37 of the bracket 23 and urged radially by a spring 38 within this bore.

The pin 36 is capable of being manually retracted by a sliding thumb button 39 on one side of the bracket 23 carried by a pin 40 which moves laterally in a guide slot 41 in the bracket 23. By this means, the locking pin is removed from the recess 35 so that the cylinder 29 may be turned to the release position of FIG. 4 for easy removal of the fishing pole. While in the release position, the nose of the pin 36 simply rides on the smooth periphery of the cylinder 29, and when the rod tip 34 is re-introduced into the groove 33 and the cylinder is turned to the locking position, FIG. 2, the pin will automatically drop into the recess 35. Thus the fishing poles are stored in a very secure manner and may be removed for use or replaced in their mountings with ease.

FIGS. 6 through 11 show a modification of the invention wherein each pole supporting unit or bracket 42 is very similar to the bracket 20 and embodies a large opening 43 near one end to receive the pole butt 26, as described previously. A rotary plastic cylinder or plug 44 is provided near the other end of the unit 42 for the purpose already described of supporting and releasably locking the rod tip portion 45. This cylinder 44 is substantially identical in construction to the previously described cylinder 29, and has the same peripheral locking recess 35 as shown in FIG. 5 for the same purpose. In lieu of the pin 36 and thumb button 39 of the previous embodiment, a plunger 46 is contained within a threaded guide sleeve 47 mounted within a threaded opening in the body portion 48 of bracket 42, FIG. 8. The plunger 46 includes a stem 49 equipped with a finger knob 50 accessible at one end of the bracket 42 radially of the cylinder 44. A compression spring 51 in the bore of guide sleeve 47 urges the plunger 46 constantly toward the recess 35 and the plunger is retractable from the recess by means of the knob 50. The sleeve 47 is adjustable within the threaded opening of the body portion 48. As best shown in FIG. 9, the knob 50 is provided at its forward end with a cross rib or projection 52 adapted to enter a cross groove 53 in the opposing end of the sleeve 47 when rotated into alignment with this groove, the end of the sleeve 47 having a reduced opening 54 to slidably receive the stem 49. The tip of the plunger 46 may enter the locking recess 35 when the rib 52 enters the groove 53. When the knob 50 is retracted and rotated to bring the rib 52 out of alignment with the groove 53, the rib will ride up on the end face 55 of the sleeve 47 so as to hold the plunger 46 out of the recess 35. At this time, the cylinder 44 is freed for turning to the release position exactly as described in the previous embodiment. When the cylinder 44 is returned manually to the locking position shown in FIG. 7, a mere turning of the knob 50 until the rib 52 registers with the groove 53 allows the plunger 46 to drop into the locking recess 35. The overall mode of use is exactly the same in all other respects with the prior form of the invention in FIGS. 1 to 5.

In FIGS. 12 to 15 there is shown another modification of the supporting unit of the invention which is actually the preferred form from a commercial standpoint although all forms are equally satisfactory in their operation and reliability. The embodiment in FIGS. 12 to 15, however, is advantageous from the standpoint of economy of manufacturing. Each supporting bracket or unit 56 includes substantially the same body portion 57 as previously described having a relatively large opening 58 near one end to receive and support the rod butt 59. Near its other end, the lower edge of the body portion 57 has an elongated horizontal recess 60 including oblique parallel end faces 61. Within this recess 60 is pivotally mounted a keeper or pole lock 62 also having diagonal parallel ends 63 to abut the faces 61 in a locking position when the keeper is bodily within the recess 60, FIGS. 12 and 13. A suitable pivot element 64 serves to pivotally secure the keeper 62 to the body portion 57, the open or pole-releasing position of the keeper 62 being shown in FIG. 14.

Figure 13:
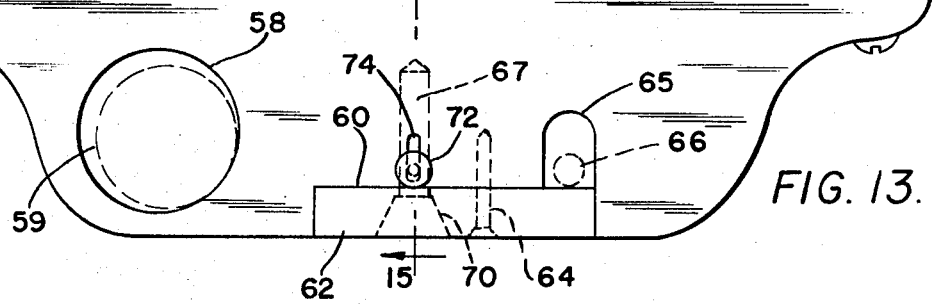
FIG. 13 is a side elevational view of the bracket in FIG. 12 in a pole-locking mode.
Figure 14:
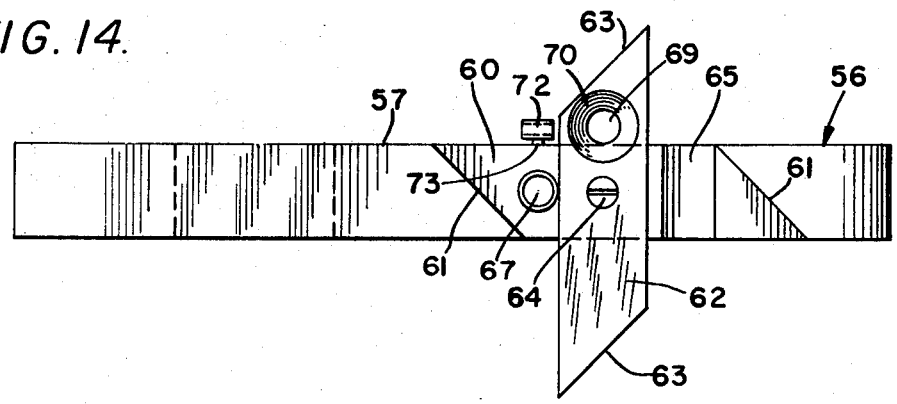
FIG. 14 is a bottom view of the bracket in a pole-releasing mode.
Figure 15:
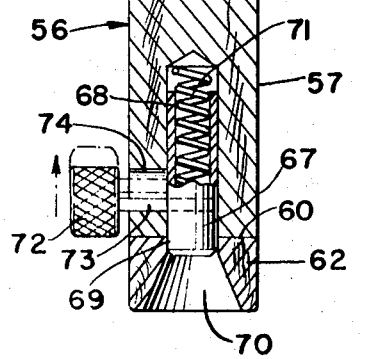
FIG. 15 is an enlarged vertical section taken on line 15—15 of FIG. 13.

The body portion 57 has a recess or groove 65 formed therein near one end of the keeper recess 60 to receive the pole tip portion 66, as shown in the drawings. Means are provided to releasably hold the keeper 62 in the pole-locking position. Such means comprises a vertically disposed plunger pin 67 mounted within a bore 68 of the body portion 57 for reciprocation. An opening 69 in the pivoted keeper 62 receives the plunger 67 to lock the keeper in the closed position relative to the groove 65. The keeper preferably has a flared recess 70 leading to the opening 69 so that a finger of the hand may be placed against the tip of the plunger 67 when desired. The plunger is thrust forwardly by a coil spring 71, FIG. 15. A knob 72 is also provided at one side of the body portion 57 for manually retracting the plunger 67 and this knob is secured to a pin 73 which extends through a vertical guide slot 74 in the body portion 57, as shown in FIGS. 13 and 15. The knob 72 may be shifted upwardly, FIG. 15, to retract the plunger 67 and release the keeper 62 so that it may be turned to the pole-releasing position uncovering the recess or groove 65.

In general, the use or operation of the invention in the preferred form and the results obtained are the same as in the prior embodiment. In all forms, the invention consists of at least one pair of the units or brackets 20, 42 or 56 arranged as in FIG. 1 to support a pair of fishing poles, as shown and described. In each form, the butt end of a pole is loosely supported in a large opening of the bracket and the narrow tip portion of the pole is held releasably in a groove of the bracket by a positive locking means which can be quickly released. The poles are supported in such a manner that they cannot accidentally fall but can be quickly removed from storage at any time.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A support for fishing poles or the like comprising a companion pair of plate-like bodies adapted for attachment to the underside of a boat ceiling and depending from said ceiling in opposed parallel relation in two substantially vertical planes, said bodies being reversed end-for-end during usage for supporting a pair of fishing poles with the handle ends of the poles extending in opposite directions relative to the tips of the poles, each plate-like body having a relatively large through opening near one end thereof receiving the handle of one fishing pole therethrough removably, each body having a recess in its lower edge near the opposite end thereof and said recess having parallel oblique end walls, the upper wall of said recess having a relatively narrow groove formed therein and projecting upwardly from the recess into said body near the end of the recess remote from the relatively large through opening, a keeper plate pivotally mounted within the recess on a pivot element located near the center of the keeper plate and recess and being swingable to a locking position where the keeper plate lies wholly within the recess with its bottom face substantially flush with the lower edge of said body, the keeper plate having parallel oblique end faces which abut said oblique end walls when the keeper plate is in said locking position, the keeper plate then covering and closing the lower end of said groove and forming a support for the tip end of a fishing pole extending through the groove, the keeper plate swingable to a release position substantially normal to the major plane of said body and substantially parallel to said groove and then uncovering said groove, the keeper plate having a locking opening formed therethrough near one end thereof, and a spring-urged retractable locking plunger contained within said body on a vertical reciprocation axis near the end of the recess remote from said groove and communicating with the top wall of the recess and registering with and entering said locking opening of the keeper plate when the latter is swung to said locking position.

2. The structure of claim 1, and a knob element attached to the locking plunger and positioned adjacent one vertical side of said body and operable to retract the plunger from the locking opening of said keeper plate, said body having a slot formed therein to permit movement of the plunger and said knob element relative to the body.

3. The structure of claim 2, and said plunger mounted within a vertical internal bore of said body and said slot communicating with said internal bore and opening through one side wall of said body adjacent said knob element.

* * * * *